(12) United States Patent
Hawley et al.

(10) Patent No.: US 11,325,329 B2
(45) Date of Patent: May 10, 2022

(54) PRE-STRESSED FIBER REINFORCING MEMBER AND METHOD FOR ITS MANUFACTURE

(71) Applicant: INTEGRATED COMPOSITE PRODUCTS, INC., Rochester, MN (US)

(72) Inventors: Ronald Clare Hawley, Winona, MN (US); Derek Joel Mazula, Sioux Falls, SD (US)

(73) Assignee: INTEGRATED COMPOSITE PRODUCTS, INC., Rochester, MN (US)

(*) Notice: Subject to any disclaimer, the term of this patent is extended or adjusted under 35 U.S.C. 154(b) by 919 days.

(21) Appl. No.: 16/121,151

(22) Filed: Sep. 4, 2018

(65) Prior Publication Data

US 2018/0370164 A1    Dec. 27, 2018

Related U.S. Application Data

(62) Division of application No. 15/549,805, filed as application No. PCT/US2016/017519 on Feb. 11, 2016, now Pat. No. 10,086,571.

(Continued)

(51) Int. Cl.
    *B29C 70/56*     (2006.01)
    *B29C 70/52*     (2006.01)
    (Continued)

(52) U.S. Cl.
    CPC ............ *B29C 70/56* (2013.01); *B29C 70/023* (2013.01); *B29C 70/52* (2013.01); *B29C 70/86* (2013.01);

(Continued)

(58) Field of Classification Search
    CPC ....... B29C 70/56; B29C 70/023; B29C 70/52; B29C 70/86; B29K 2023/14; B29K 2309/08; B29K 2509/08; B29L 2031/003

(Continued)

(56) References Cited

U.S. PATENT DOCUMENTS 2,545,981 A     3/1951   Warp
2,843,153 A *   7/1958   Young ................... B29C 53/665
                                                               285/112

(Continued)

FOREIGN PATENT DOCUMENTS

EP         0 552 918 A1     7/1993
WO    WO 01/51730 A1     7/2001

(Continued)

OTHER PUBLICATIONS

International Patent Application No. PCT/US2014/048048, filed Jul. 24, 2014; International Search Report and Written Opinion, dated Nov. 5, 2014; 12 pages.

(Continued)

*Primary Examiner* — Brent T O'Hern
(74) *Attorney, Agent, or Firm* — Mueting Raasch Group

(57) ABSTRACT

A composite structural article (100) includes a polymeric body (35) having a first major surface (24) and an opposing second major surface (22) and a rib element (30) extending away from the first major surface. A reinforcing member (10) is embedded within a free end portion (34) of the rib member (30). The reinforcing member includes an elongated polymer rod having a rod length and a plurality of co-extending continuous fibers (20), embedded and distributed within the elongated polymer rod. The fibers are under tension and may have a helical or twisted configuration along the rod length.

15 Claims, 3 Drawing Sheets

Related U.S. Application Data

(60) Provisional application No. 62/115,409, filed on Feb. 12, 2015.

(51) Int. Cl.

| | | |
|---|---|---|
| B29C 70/86 | (2006.01) | |
| B29C 70/02 | (2006.01) | |
| B29K 23/00 | (2006.01) | |
| B29K 309/08 | (2006.01) | |
| B29K 509/08 | (2006.01) | |
| B29L 31/00 | (2006.01) | |

(52) U.S. Cl.
CPC ...... B29K 2023/14 (2013.01); B29K 2309/08 (2013.01); B29K 2509/08 (2013.01); B29L 2031/003 (2013.01)

(58) Field of Classification Search
USPC .................................................. 264/136
See application file for complete search history.

(56) References Cited

U.S. PATENT DOCUMENTS

| | | | |
|---|---|---|---|
| 2,877,501 | A | 3/1959 | Bradt |
| 3,425,204 | A | 2/1969 | Schuller et al. |
| 3,680,495 | A | 8/1972 | Pike |
| 3,691,000 | A | 9/1972 | Kalnin |
| 4,051,290 | A | 9/1977 | Jutte et al. |
| 4,289,465 | A | 9/1981 | Killmeyer et al. |
| 4,312,917 | A | 1/1982 | Hawley |
| 4,357,292 | A | 11/1982 | Myers |
| 4,492,607 | A | 1/1985 | Halcomb |
| 4,623,281 | A | 11/1986 | Verbauwhede et al. |
| 4,636,422 | A | 1/1987 | Harris et al. |
| RE32,772 | E | 10/1988 | Hawley |
| 4,840,826 | A * | 6/1989 | Shirasaki ............... B29C 70/08 428/36.91 |
| 4,937,032 | A | 6/1990 | Krone et al. |
| 5,045,377 | A | 9/1991 | Amata |
| 5,073,441 | A | 12/1991 | Melee et al. |
| 5,164,255 | A | 11/1992 | Weeks |
| 5,246,520 | A | 9/1993 | Scanlon et al. |
| 5,344,687 | A | 9/1994 | Grimnes |
| 5,360,503 | A | 11/1994 | Coffy |
| 5,460,673 | A | 10/1995 | Cahuzac |
| 5,514,745 | A | 5/1996 | Yoshino |
| 5,593,633 | A | 1/1997 | Dull et al. |
| 5,779,961 | A | 7/1998 | Teutsch |
| 5,868,080 | A | 2/1999 | Wyler et al. |
| 5,961,288 | A | 10/1999 | Rene Legendre et al. |
| 6,368,701 | B1 | 4/2002 | Nomura et al. |
| 6,581,644 | B1 * | 6/2003 | Monette ............... F16L 9/12 138/125 |
| 6,655,299 | B2 | 12/2003 | Preisler et al. |
| 6,844,040 | B2 | 1/2005 | Pabedinskas et al. |
| 7,048,880 | B2 | 5/2006 | Kia et al. |
| 7,592,388 | B2 | 9/2009 | Wick et al. |
| 7,814,741 | B2 | 10/2010 | Hattori et al. |
| 8,376,426 | B2 | 2/2013 | Choi et al. |
| 8,815,368 | B2 | 8/2014 | Neitzke |
| 8,985,034 | B2 | 3/2015 | Dummett |
| 2002/0088599 | A1 | 7/2002 | Davis et al. |
| 2003/0062647 | A1 | 4/2003 | Deteresa et al. |
| 2010/0028616 | A1 | 2/2010 | Yamanouchi et al. |
| 2010/0092770 | A1 | 4/2010 | Wadahara et al. |
| 2010/0239856 | A1 | 9/2010 | Olson et al. |
| 2012/0048154 | A1 | 3/2012 | Toomer et al. |
| 2013/0164501 | A1 | 6/2013 | Jung et al. |
| 2013/0309442 | A1 | 11/2013 | Ruby et al. |
| 2014/0178635 | A1 | 6/2014 | Imaizumi et al. |
| 2014/0186600 | A1 | 7/2014 | Dyksterhouse |
| 2014/0196837 | A1 | 7/2014 | Polewarczyk et al. |
| 2015/0151506 | A1 | 6/2015 | Hawley et al. |
| 2017/0232703 | A1 | 8/2017 | Hawley et al. |
| 2018/0043643 | A1 | 2/2018 | Hawley et al. |

FOREIGN PATENT DOCUMENTS

| | | |
|---|---|---|
| WO | WO 2004/101909 A1 | 11/2004 |
| WO | WO 2010/108015 A2 | 9/2010 |
| WO | WO 2013/021848 A1 | 2/2013 |
| WO | WO 2013/032620 A1 | 3/2013 |
| WO | WO 2015/013529 A1 | 1/2015 |
| WO | WO 2016/025564 A2 | 2/2016 |
| WO | WO 2016/025564 A3 | 2/2016 |
| WO | WO 2016/130784 A1 | 8/2016 |

OTHER PUBLICATIONS

International Patent Application No. PCT/US2014/048048, filed Jul. 24, 2014; International Preliminary Report on Patentability dated Feb. 4, 2016; 8 pages.

International Patent Application No. PCT/US2015/044789, filed Aug. 12, 2015; International Search Report and Written Opinion dated Feb. 16, 2016; 19 pages.

International Patent Application No. PCT/US2015/044789, filed Aug. 12, 2015; International Preliminary Report on Patentability dated Feb. 23, 2017; 12 pages.

International Patent Application No. PCT/US2016/017519, filed Feb. 11, 2016; International Search Report and Written Opinion, dated May 6, 2016; 11 pages.

International Patent Application No. PCT/US2016/017519, filed Feb. 11, 2016; International Preliminary Report on Patentability dated Aug. 24, 2017; 7 pages.

\* cited by examiner

PRE-STRESSED FIBER REINFORCING MEMBER AND METHOD FOR ITS MANUFACTURE

This application is a divisional application of U.S. patent application Ser. No. 15/549,805, filed Aug. 9, 2017, which is the § 371 U.S. National Stage of International Application No. PCT/US16/17519, filed Feb. 11, 2016, which claims the benefit of U.S. Provisional Application No. 62/115,409, filed Feb. 12, 2015, the disclosures of which are incorporated by reference herein in their entireties.

BACKGROUND

The physical properties of thermoplastic polymers can be improved by the incorporation of filler materials such as glass fibers. The incorporation of reinforcing material, such as glass fiber, into polymeric products beneficially affects resin properties such as tensile strength, stiffness, dimensional stability and resistance to creep and thermal expansion. Traditional methods of producing such articles have been injection molding or compression molding standard, pre-compounded fiber glass reinforced polymer. While satisfying certain objectives in optimizing the quality of the finished product, conventional filled products have proven to be commercially costly and in other ways have fallen short of their objectives in terms of weight, impact performance and strength. Improvements to producing fiber reinforced articles are desired.

SUMMARY

The present disclosure relates to a pre-stressed fiber reinforcing member and methods of making the same. The pre-stressed fiber reinforcing member can improve the structure properties while reducing the weight and/or cost of the composite structural article. The pre-stressed fiber reinforcing member may include a plurality of continuous fiber placed in or under tension within the reinforcing member.

In one aspect, a reinforcing member includes an elongated polymer rod extending between a proximal (first) end and a distal (second) end. A plurality of co-extending continuous fibers are embedded and distributed within the elongated polymer rod. The plurality of co-extending continuous fibers form a helix or twisted configuration from the proximal end to the distal end. The reinforcing member may include a resin or polymer skin layer having substantially no co-extending continuous fibers and a concentration of co-extending continuous fibers increases as towards a longitudinal axis of the elongated polymer rod.

In another aspect, a method includes the steps of coating a plurality of co-extending continuous fibers with a thermoplastic polymer to form coated continuous fibers and forming the coated continuous fibers into an elongated polymer rod. Then the method includes spiral winding or twisting the co-extending continuous fibers to form a pre-stressed fiber reinforcing member having a fiber helix within the elongated polymer rod.

The method may further include embedding the pre-stressed fiber reinforcing member into a polymeric body to form a composite structural article. The composite structural article may include a polymeric body having a first major surface and an opposing second major surface, and the pre-stressed fiber reinforcing member is embedded within the polymeric body.

The composite structural article may include a polymeric body having a first major surface and an opposing second major surface and a rib element extending away from the first major surface and extending along the first major surface a length value. The rib element has an attached portion fixed to the first major surface and an opposing free end portion. A pre-stressed fiber reinforcing member is embedded within the opposing free end portion of the rib. The reinforcing member includes an elongated polymer rod having a rod length and a plurality of co-extending continuous fibers, under tension and embedded and distributed within the elongated polymer rod. The fibers may have a helical or twisted configuration along the rod length.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
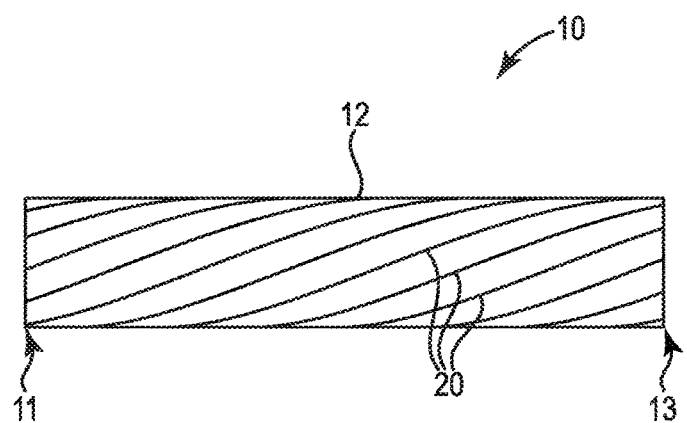
FIG. 1 is a side elevation schematic diagram view of an illustrative pre-stressed fiber reinforcing member.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

It should be noted that "top" and "bottom" (or other terms like "upper" and "lower" or "first" and "second") are utilized strictly for relative descriptions and do not imply any overall orientation of the article in which the described element is located.

The phrase "pre-stressed" refers to a configuration where a fiber is in or under tension within a polymeric rod and the fiber may be twisted or disposed in a helical configuration along the length of the polymeric rod.

The present disclosure relates to a pre-stressed fiber reinforcing member and methods of making the same. The pre-stressed reinforcing fiber member can improve the structural properties while reducing the weight and/or cost of the composite structural article. The pre-stressed fiber reinforcing member can be placed strategically within the polymeric body to provide strength where it is needed within the polymeric body. The pre-stressed fiber configuration provides an unusual or surprising increase in the tensile strength of these reinforcing members as compared to reinforcing members that are not pre-stressed. In particular, these pre-stressed fiber reinforcing members include a plurality of co-extending continuous fibers that are in tension within the polymer rod and the plurality of co-extending continuous fibers. These composite structural articles possess a high strength, stiffness, and high impact resistant with a reduced weight as compared to conventional structural articles. While the present disclosure is not so limited, an appreciation of various aspects of the disclosure will be gained through a discussion of the examples provided below.

FIG. 1 is a side elevation schematic diagram view of an illustrative pre-stressed fiber reinforcing member 10. The reinforcing member 10 includes an elongated polymer rod 12 extending between a proximal (first) end 11 and a distal (second) end 13, and a plurality of co-extending continuous fibers 20, embedded and distributed within the elongated polymer rod 12, and forming a helix or twisted configuration from the proximal end 11 to the distal end 13. The helical continuous fibers 20 are preferably under tension within the reinforcing member 10, providing a "pre-stressed" fiber reinforcing member 10.

The pre-stressed fiber reinforcing member 10 can be formed by applying a tension to the plurality of co-extending continuous fibers 20 (that are embedded and distributed within the elongated polymer rod 12) while the elongated polymer rod 12 is still in a molten or softened state and then twisting the proximal (first) end 11 relative to the distal (second) end 13 to form a twisted fiber configuration. Once in this twisted fiber configuration, and under tension, the elongated polymer rod 12 can be cooled or solidified to lock in the stress or tension of the co-extending continuous fibers 20. This configuration may be referred to as the "pre-stressed" fiber reinforcing member.

In many embodiments the co-extending continuous fibers 20 are not uniformly distributed throughout a cross-section of the elongated polymer rod 12 and may concentrate towards the longitudinal axis of the elongated polymer rod 12. This may occur due as the fibers are twisted. In many of these embodiments a skin layer of polymer (that forms the polymeric body) may form on the outer surface of the pre-stressed fiber reinforcing member 10 where there is no co-extending continuous fibers 20. This skin layer may form 10% or less or from 1 to 10% of the diameter of the pre-stressed fiber reinforcing member 10. In some embodiments the co-extending continuous fibers 20 are uniformly distributed throughout a cross-section of the elongated polymer rod 12.

Polymer material "wets out" the co-extending continuous fibers 20. Thus resin or polymeric material is dispersed about all of the co-extending continuous fibers 20. The reinforcing member 10 can include at least 1000, or at least 5000, or at least 10000 or at least 15,000 co-extending continuous glass fibers.

The continuous fibers 20 can be formed of any suitable fiber material providing tensile strength and/or stiffness. The continuous fibers 20 can be composed of: glass, carbon, graphite, basalt, DuPont Kevlar brand aramid fibers (i.e., poly-paraphenylene terephthalamide), ceramics, natural fibers, polymeric fibers, and various metals. Preferably the continuous fibers 20 are composed of glass, carbon, graphite or Kevlar (i.e., poly-paraphenylene terephthalamide) fibers. In some embodiments the continuous fibers 20 are a mixture of glass and carbon fibers or glass and Kevlar fibers or glass and graphite fibers.

The continuous fibers 20 can have any suitable diameter such as 5 to 100 micrometers or less than 50 micrometers or from 5 to 50 micrometers or from 5 to 30 micrometers, or from 5 to 20 micrometers, or from 7 to 15 micrometers. The continuous fiber 20 can have any suitable length and preferably extends the entire lateral length of the reinforcing member 10. In many embodiments the continuous fiber 20 has a length of at least 0.1 meter, or 0.5 meter or 1 meter or greater than 1 meter.

The reinforcing member 10 can have a diameter or largest lateral dimension in a range from 250 to 10000 micrometers or from 500 to 5000 micrometers or from 1000 to 5000 micrometers or less than 10 mm or less than 5 mm. The reinforcing member 10 can have at least 40% wt fiber or at least 50% wt fiber or from 40 to 90% wt fiber or from 50 to 80% wt fiber. Each continuous fiber element can have at from 60 to 10% wt polymer or from 50 to 20% wt polymer.

The reinforcing member 10 can have any useful cross-sectional shape. In many embodiments the reinforcing member 10 has a circular or oval cross-sectional shape. In other embodiments the reinforcing member 10 has a polygon cross-sectional shape.

The polymer forming the reinforcing member 10 can be any suitable polymeric material. In many embodiments the polymeric material is a thermoplastic material. Useful polymeric material includes polypropylene, polyethylene, nylon, acrylonitrile butadiene styrene, styrene acrylonitrile, acrylic or styrene, for example. Further useful polymers include PBT polyester, PET polyester, polyoxymethylene, polycarbonite or polyphenylene sulfide for example. Higher temperature polymeric material includes polysulfone, polyethersulfone, polyethereetherketone, or liquid crystal polymer, for example.

In some embodiments a skin layer or skin region of polymer material (outer polymer layer 26 illustrated in FIG. 4) surrounds the plurality of co-extending continuous fibers 20 having a helical or twisted configuration. This skin layer or skin region can be free of fiber material or have less than 10% or less than 5% fiber material or is free of fiber material (both continuous fiber and fiber dispersion). Preferably the skin layer or skin region is free of the plurality of co-extending continuous fibers 20 having a helical or twisted configuration. The skin layer or skin region can have any useful thickness such as 25 micrometers to 1000 micrometers or from 50 to 500 micrometers or from 250 to 500 micrometers.

The reinforcing member 10 has a core region that includes the plurality of co-extending continuous fibers 20 in tension. The skin layer or skin region may surround the core region. The core region may be a fiber concentration of at least 40% wt or from 40%/o wt to 90%, wt or from 50% wt to 90% wt. The fiber concentration may increase towards the center or longitudinal axis of the reinforcing member.

The plurality of co-extending continuous fibers having a helical or twisted configuration can have any useful period or distance for a complete rotation along the reinforcing member 10 or rod length. The helical period may be in a range of at least about 5 cm, or at least 10 cm, or at least 20 cm, or at least 30 cm. In many embodiments the helical period is in a range from about 5 cm to 50 cm or from 5 cm to 30 cm or from 5 cm to 20 cm.

Figure 2:
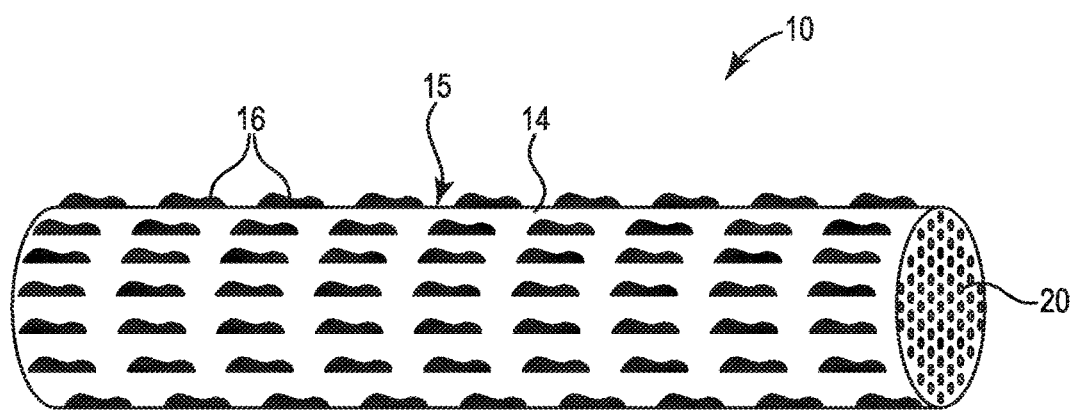
FIG. 2 is a side elevation schematic diagram view of another illustrative pre-stressed fiber reinforcing member having a textured surface.

FIG. 2 is a side elevation schematic diagram view of another illustrative pre-stressed fiber reinforcing member 10 having a textured surface 15. Adding texture 16 to the outer surface 14 of the elongated polymer rod 10 can increase the outer surface area and improve adhesion to a polymeric body when forming a composite structural article. The texture 16 can include ridges or valleys imprinted into the outer surface 14 of the elongated polymer rod 10. The term "textured" refers to a surface having uniform or non-uniform undulating surface or peaks and valleys along the surface. The texture may assist in holding the pre-stressed fiber reinforcing member in place during the molding process of a composite article. The texture may assist in centering the pre-stressed fiber reinforcing member in a mold cavity during the molding process of a composite article.

In many embodiments the texture 16 increases a surface area of the outer surface 14 by at least 5% or at least 10% or at least 20%. In one example, the textured surface 15 is formed by knurling the outer surface 14 of the elongated polymer rod 10. The texture can be formed by any useful process, such as embossing or over-molding for example.

Figure 3:
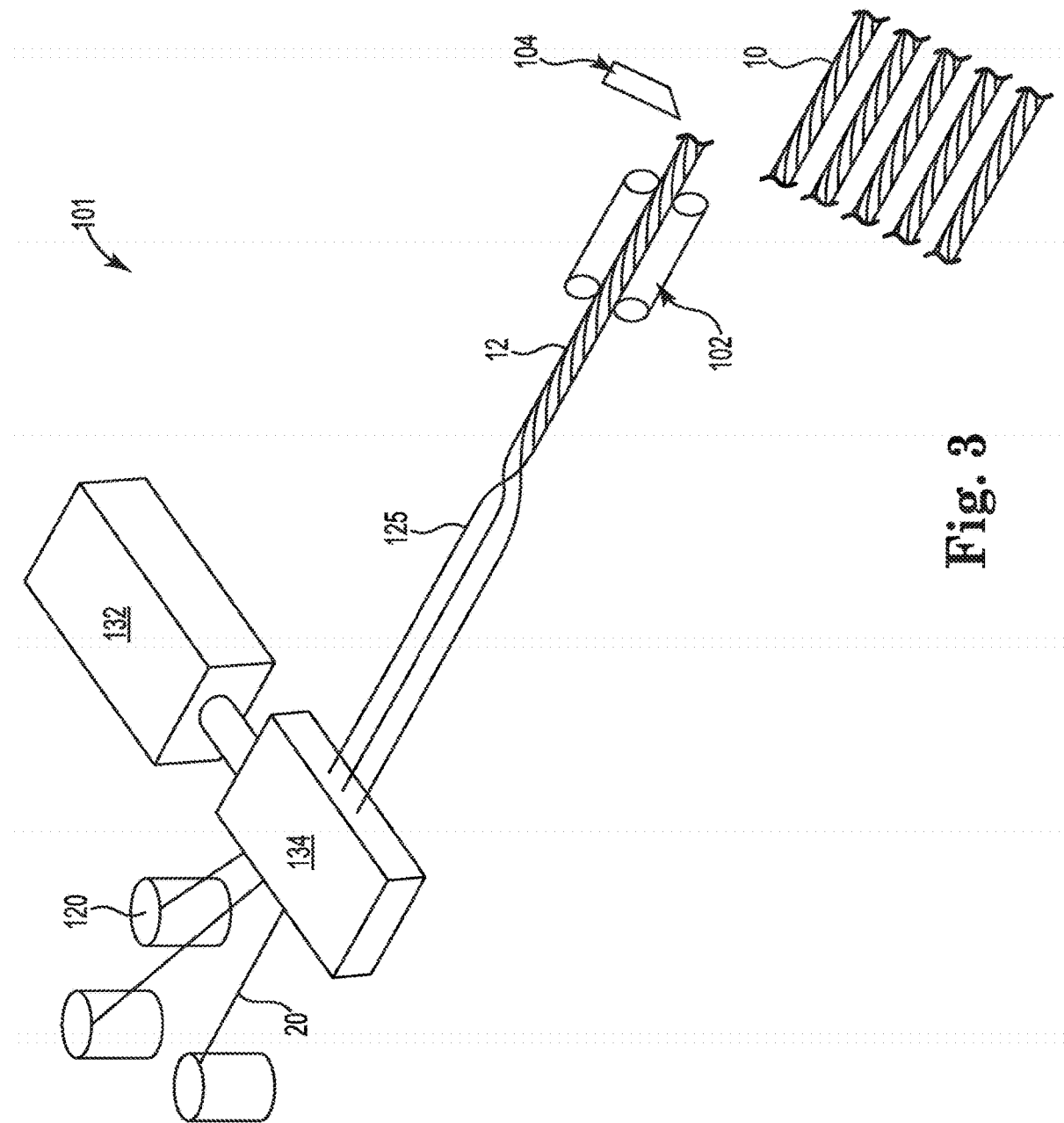
FIG. 3 is a schematic diagram of a method of forming an illustrative pre-stressed fiber reinforcing member.

FIG. 3 is a schematic diagram of a method 101 of forming an illustrative pre-stressed fiber reinforcing member 10. Once formed, the pre-stressed fiber reinforcing member 10 can then be embedded into a polymeric body to provide reinforcement properties to a composite polymeric body.

Fiber spools 120 provide a bundle of continuous fiber to an extruder die 134. The bundle of continuous fiber can each include a plurality of continuous fibers such as at least, 1000 fibers, or at least 2500 fibers or at least 5000 fibers. The extruder 132 extrudes polymer to the die 134 and the continuous fibers 20 pass through the die and "wets out" each continuous fiber with the resin or polymer. The extruder die 134 embeds the bundle of continuous fiber within resin or polymer material and forms a plurality of continuous coated fiber elements 125. These continuous coated fiber elements 125 can be guided together to form an elongated polymer rod 12 and spiral wound or twisted to form a pre-stressed fiber reinforcing member 10 having a fiber helix within the elongated polymer rod.

The spiral winding or twisting of the continuous coated fiber elements 125 can be provided downstream of the die 134. A puller/twister 102 can induce tension within the continuous fibers 20 embedded within the molten or semi-solid polymer rod and may also induce a twist or helical configuration of the continuous fibers 20 embedded within the molten or semisolid polymer rod. The puller/twister 102 can impart any level of twist desired to the pre-stressed fiber reinforcing member 10 within the elongated polymer rod 12. The elongated polymer rod 12 can be cooled or solidified to lock in the stress or tension of the co-extending continuous fibers 20. This configuration may be referred to as the "pre-stressed" fiber reinforcing member.

The pre-stressed fiber reinforcing member 10 can pass though puller element 102 and be diced or cut (with a knife 104, for example) to an appropriate size to form the reinforcing member 10 described herein. The cut reinforcing member 10 can then be embedded into a polymeric body to form a composite structural article by injection molded or molding.

Figure 4:
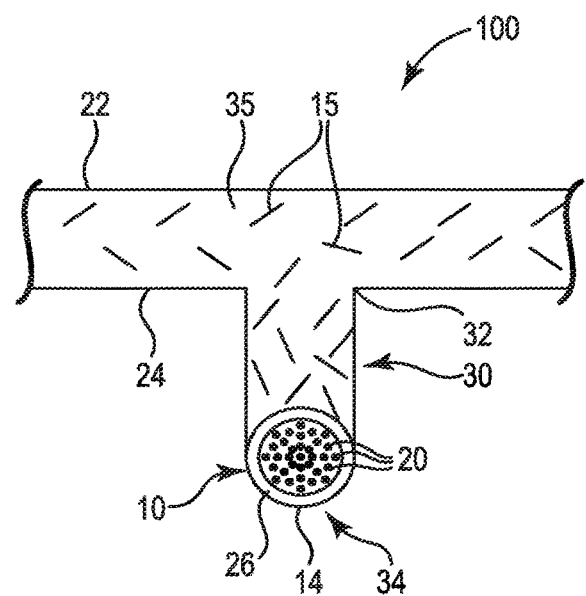
FIG. 4 is a cross-sectional schematic diagram view of an illustrative composite structural article including the pre-stressed fiber reinforcing member.

FIG. 4 is a cross-sectional schematic diagram view of an illustrative composite structural article 100 including the pre-stressed fiber reinforcing member 10. The composite structural article 100 includes a polymeric body 35 having a first major surface 24 and an opposing second major surface 22, and a pre-stressed fiber reinforcing member 10, described herein, embedded within the polymeric body 35.

In many embodiments, the polymeric body 35 includes a laterally extending rib member 30 extending away from the first major surface 24 and having a lateral length or length value and forming a portion of the polymeric body 35. The reinforcing member 10 extends along the lateral length or length value and is embedded within the rib member 30. In many embodiments the rib element length is coextensive with the reinforcing member rod length or the rib element length is substantially equal with the reinforcing member rod length.

The rib element 30 may extend away from the first major surface 24 and extending along the first major surface 24 a length value. The rib element 30 includes an attached portion 32 fixed to the first major surface 24 and an opposing free end portion 34. The reinforcing member 10 is embedded within the opposing free end portion 34. As described above, the reinforcing member 10 includes an elongated polymer rod having a rod length and a plurality of co-extending continuous fibers 20, embedded and distributed within the elongated polymer rod. The fibers 20 having a helical or twisted configuration along the rod length. The illustrative composite structural article 100 has a single, or only one, or less than two pre-stressed fiber reinforcing member 10 per rib element 30.

The reinforcing member 10 may include a skin layer 26 of polymer material surrounding the plurality of co-extending continuous fibers 20 having a helical or twisted configuration. In many embodiments the skin layer 26 is formed of the same type of polymer material as the polymer material dispersing the plurality of co-extending continuous fibers 20, embedded and distributed within the elongated polymer rod.

In many embodiments, the rib element 30 opposing free end portion 34 defines a curved or rounded end surface 14. In these embodiments, the reinforcing member 10 may define the curved or rounded end surface 14. This may be particularly useful when the reinforcing member 10 is molded onto or into the rib element 30 of the composite structural article 100.

At least 50% of an outer surface area of the reinforcing member 10 may be fixed to the solid or polymeric body 35 or rib element 30. The reinforcing member 10 may have less than 90% of the outer surface area of the reinforcing member 10 fixed to the solid or polymeric body 35 or rib element 30. The reinforcing member 10 may have from 50%, to 90% of the outer surface area of the reinforcing member 10 fixed to the solid or polymeric body 35 or rib element 30. FIG. 4 illustrates that about 50% to 75% of the outer surface area of the reinforcing member 10 is fixed to the solid or polymeric body 35 rib element 30 distal or free end 34.

The solid or polymeric body 35 can be formed of any suitable polymeric material. In many embodiments the polymeric material is a thermoplastic material. Useful polymeric material includes polypropylene, polyethylene, nylon, acrylonitrile butadiene styrene, styrene acrylonitrile, acrylic or styrene, for example. Further useful polymers include PBT polyester, PET polyester, polyoxymethylene, polycarbonite or polyphenylene sulfide for example. Higher temperature polymeric material includes polysulfone, polyethersulfone, polyethereetherketone, or liquid crystal polymer, for example.

In many embodiments the polymer utilized to form the pre-stressed fiber reinforcing member 10 is compatible with, or is the same type or kind of, polymer material forming the solid or polymeric body of the composite structural element 35. In other embodiments the polymer utilized to form the pre-stressed fiber reinforcing member 10 is a different type or kind of polymer material. In some embodiments the polymer utilized to form the pre-stressed fiber reinforcing member 10 is a homopolymer and the polymer material forming the solid or polymeric body of the composite structural element 35 is a copolymer. In other embodiments the polymer utilized to form the pre-stressed fiber reinforcing member 10 is a copolymer and the polymer material forming the solid or polymeric body of the composite structural element 35 is a homopolymer.

In many embodiments a plurality of fibers form a fiber dispersion within the polymeric body 35. The fibers forming this fiber dispersion have an average length of less than 15 mm and an average diameter of less than 50 micrometers. The polymeric material forming the solid or polymeric body 35 can includes a plurality of random fibers forming a fiber dispersion in the polymeric material. This fiber dispersion has an average fiber length of less than 15 mm or less than 12 mm or less than 5 mm or less than 1 mm. The fiber dispersion has an average fiber length in a range from 1 to 15 mm or in a range from 5 to 12 mm and can be termed "long fiber thermoplastic". In other embodiments, the fiber dispersion has an average fiber length in a range from 0.1 to 1 mm or in a range from 0.25 to 0.75 mm and can be termed "short fiber thermoplastic".

The fibers forming the fiber dispersion can be formed of materials that are the same or different than the material forming the continuous fibers 20 such as glass, carbon, basalt, graphite, DuPont Kevlar brand aramid fibers, ceramics, natural fibers, polymeric fibers, and various metals, for example. Preferably fibers forming the fiber dispersion can be composed of glass, carbon, graphite or Kevlar (i.e., poly-paraphenylene terephthalamide) fibers. In some embodiments the fibers forming the fiber dispersion are a mixture of glass and carbon fibers or glass and Kevlar fibers or glass and graphite fibers. In some embodiments the fibers forming the fiber dispersion is glass and the fibers forming the continuous fibers 20 are carbon, Kevlar or graphite or a mixture of glass and carbon, Kevlar or graphite.

The fiber dispersion can be present in the polymeric material of the solid or polymeric body 35 can be in a range from 5 to 60% by weight. Preferably the fiber dispersion can be present in the polymeric material in a range from 10 to 50% by weight, or in a range from 20 to 45% by weight, or in a range from 30 to 40% by weight. Useful polymeric material with fiber dispersions are commercially available from RTP Company, Winona, Minnesota under the trade designations "RTP 107" (polypropylene with 40% wt short glass fiber dispersion) and "RTP 80107" (polypropylene with 40% wt long glass fiber dispersion), for example.

In many embodiments, the pre-stressed fiber reinforcing member 10 does not include, or is free of the fiber dispersion that is present in the solid or polymeric body 35. In many embodiments the reinforcing member 10 skin layer 26 does not include, or is free of the fiber dispersion that is present in the solid or polymeric body 35.

Figure 5:
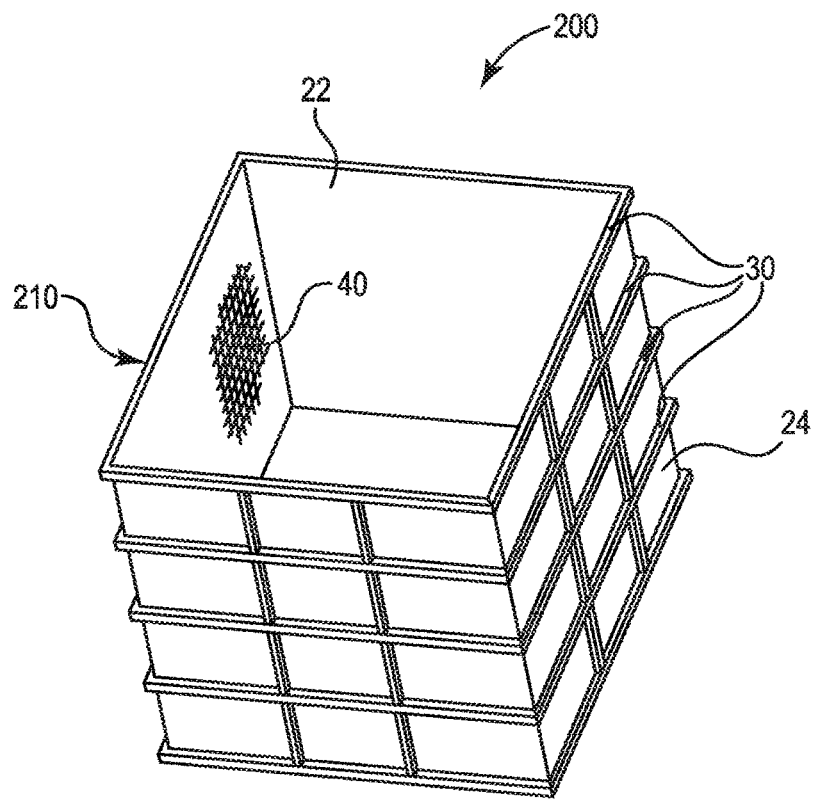
FIG. 5 is a perspective view of a container formed of composite structural articles including pre-stressed fiber reinforcing member described herein.

FIG. 5 is a perspective view of a container 200 formed of composite structural articles including the twisted or pre-stressed fiber reinforcing member described herein. The container 200 is formed of at least four composite structural panels 210. Each composite structural panel or side of the container 200, includes one or more pre-stressed fiber reinforcing members 10 embedded in ribs 30 that extend away from the first major surface 24.

In this embodiment, a second major surface 22 is planar and an opposing first major surface 24 includes a plurality of intersecting rib elements 30 that extend away from the first major surface 24. A first plurality of parallel rib elements extend along a length of the panel member and a second plurality of parallel rib elements extend along a width of the panel members. The first plurality of rib elements intersect and are orthogonal to the second plurality of rib elements. One or more pre-stressed fiber reinforcing members 10 may be embedded in each rib 30, preferably along a distal end portion of the rib 30 (as illustrated in FIG. 4).

In some embodiments, an open mesh woven element 40 can be embedded within the second major surface 22 and formed of any suitable fiber material providing tensile strength and/or stiffness in two orthogonal directions and impact resistance. The open mesh woven element 40 can be formed of a plurality of first parallel fibers extending in a first direction in a plane and a plurality of second parallel fibers extending in a second direction (orthogonal to the first direction) in the plane. The first plurality and second plurality of fibers can be composed of: glass, basalt, carbon, graphite, DuPont Kevlar brand aramid fibers, ceramics, natural fibers, polymeric fibers, and various metals. The open mesh woven element 40 can impart impact resistance and strengthen the composite structural panels 210.

The composite structural article can be formed by any suitable method. In many embodiments the pre-stressed fiber reinforcing member can be placed in a suitable mold and the polymeric material disposed into the mold to form the composite structural article. Preferably the composite structural articles are formed by inserting the pre-stressed fiber reinforcing member in a mold and polymer material is compression molded or injection molded about the pre-stressed fiber reinforcing member.

The pre-stressed fiber reinforcing member described herein can be utilized in structural composite articles for a variety of industries, markets and applications. The composite articles described herein are particularly useful for: automotive parts such as bumpers, fenders; transportation such as pallets and containers; aerospace such as airplane components; military such as missile components, recreation such as vehicle frame components.

One illustrative example provided three polypropylene composite panels for testing. The first was a control sample (C) that consisted of polypropylene and 40% wt glass fiber dispersion (long glass fibers or LFT) with no reinforcing member. A second sample (1) was the same polypropylene and 40% wt glass fiber dispersion with a non-twisted (not pre-stressed) reinforcing member (4000 filaments at about 15 micrometer in diameter). The final sample (2) was the same polypropylene and 40% wt glass fiber dispersion with a pre-stressed (twisted) fiber reinforcing member (with 4000 filaments at about 15 micrometer in diameter).

These samples were subjected to flexural testing. The control sample (C) had a test result of 477 pounds to failure. The first sample (1) had a test result of 1506 pounds to failure. The second sample (2) had a test result of 1758 pounds to failure. It is surprising that by simply pre-stressing or twisting the reinforcing member the structural properties would increase as much as was shown.

One exemplary composite structural article includes a polymeric body formed of a polypropylene copolymer and filled with about 20% wt long or short glass fiber. The single pre-stressed fiber reinforcing member is embedded within a free end of a rib element of the polymeric body. The pre-stressed fiber reinforcing member has a diameter of about 5 mm and includes about 16,000 continuous glass fibers (each fiber having a diameter of about 15 micrometers) dispersed in polypropylene homopolymer. The pre-stressed (twisted or helical configuration along the length of the reinforcing member) fiber reinforcing member has an outer polymer region or skin layer (that is substantially free of continuous glass fibers or fiber dispersion) that is about 250 to 500 micrometers thick. The filled polypropylene copolymer is injection molded onto the pre-stressed fiber reinforcing member. The pre-stressed fiber reinforcing member forms a curved portion of a free end of a rib member extending from the composite structural article.

Thus, embodiments of PRE-STRESSED FIBER REINFORCING MEMBER are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A method comprising:
   coating a plurality of co-extending continuous fibers with a thermoplastic polymer to form coated continuous fibers;
   pre-stressing the coated continuous fibers into an elongated polymer rod to create continuous fibers in tension within the elongated polymer rod and form a pre-stressed fiber reinforcing member; and
   embedding the pre-stressed fiber reinforcing member into a polymeric body to form a composite structural article, wherein the polymeric body comprises a plurality of fibers forming a fiber dispersion within the polymeric body, the fibers having an average length of less than 15 mm, and an average diameter of less than 50 micrometers and the polymeric body comprises 10% to 50% by weight fiber dispersion, and the fiber dispersion is not present within the pre-stressed reinforcing member.

2. The method according to claim 1, wherein the embedding step comprises molding the polymeric body onto the pre-stressed fiber reinforcing member.

3. The method according to claim 1, wherein the pre-stressing occurs downstream of the coating step and the pre-stressing comprises twisting the continuous fibers to induce tension within the continuous fibers of the pre-stressed fiber reinforcing member.

4. The method according to claim 1, further comprising imparting texture to an outer surface of the pre-stressed fiber reinforcing member after the pre-stressing step and the imparting texture step increases a surface area of an outer surface of the pre-stressed fiber reinforcing member by at least 10%.

5. The method according to claim 1, wherein the embedding step comprises embedding the pre-stressed fiber reinforcing member into a rib element of the polymeric body, the rib element extending away from a major surface of the polymeric body.

6. The method according to claim 1, wherein the pre-stressing step comprises pre-stressing the coated continuous fibers into a molten elongated polymer rod and then cooling or solidifying the elongated polymer rod to create continuous fibers in tension within the elongated polymer rod and form a pre-stressed fiber reinforcing member.

7. The method according to claim 1, wherein the pre-stressing occurs downstream of the coating step and the pre-stressing comprises twisting the continuous fibers at least one complete rotation to induce tension within the continuous fibers of the pre-stressed fiber reinforcing member.

8. The method according to claim 1, wherein the pre-stressing forms a twisted or helical configuration of continuous fibers along a length of the pre-stressed fiber reinforcing member.

9. The method according to claim 1, wherein the pre-stressed fiber reinforcing member continuous fibers comprise at least 1000 glass fibers, carbon fibers or poly-paraphenylene terephthalamide fibers.

10. The method according to claim 1, wherein the pre-stressed fiber reinforcing member comprises 40-90% wt fiber and 60-10% wt polymer.

11. The method according to claim 1, wherein the pre-stressed fiber reinforcing member comprises 50-80% wt fiber and 50-20% wt polymer.

12. The method according to claim 1, wherein the pre-stressed fiber reinforcing member comprises a plurality of co-extending continuous fibers that increase in concentration towards a longitudinal axis of the elongated polymer rod.

13. A method comprising:
   coating a plurality of co-extending continuous fibers with a thermoplastic polymer to form coated continuous fibers;
   twisting the coated continuous fibers into an elongated polymer rod to create twisted or helical continuous fibers in tension within the elongated polymer rod and forming a pre-stressed fiber reinforcing member; and
   embedding the pre-stressed fiber reinforcing member into a polymeric body to form a composite structural article, wherein the pre-stressed fiber reinforcing member continuous fibers comprise at least 1000 glass fibers, carbon fibers or poly-paraphenylene terephthalamide fibers, the pre-stressed fiber reinforcing member comprises 50-80% wt fiber and 50-20% wt polymer, and the polymeric body comprises a plurality of fibers forming a fiber dispersion within the polymeric body, the fibers having an average length of less than 15 mm, and an average diameter of less than 50 micrometers and the polymeric body comprises 10% to 50% by weight fiber dispersion.

14. The method according to claim 13, wherein the fiber dispersion is not present within the pre-stressed reinforcing member.

15. The method according to claim 14, wherein the plurality of co-extending continuous fibers comprise a helical configuration and has at least one complete rotation along the elongated polymer rod length.

* * * * *